United States Patent
Schimmer et al.

(10) Patent No.: US 7,649,467 B2
(45) Date of Patent: Jan. 19, 2010

(54) SYSTEM AND METHOD FOR LOCALIZING SPORTS EQUIPMENT

(75) Inventors: Martijn Schimmer, Rotterdam (NL); George Johannes Ferdinandus Blom, Rijsbergen (NL)

(73) Assignee: Eyeon Trust B.V., Rijsbergen (NL)

( * ) Notice: Subject to any disclaimer, the term of this patent is extended or adjusted under 35 U.S.C. 154(b) by 0 days.

(21) Appl. No.: 10/552,549

(22) PCT Filed: Apr. 8, 2004

(86) PCT No.: PCT/NL2004/000233

§ 371 (c)(1),
(2), (4) Date: Jul. 20, 2006

(87) PCT Pub. No.: WO2004/092772

PCT Pub. Date: Oct. 28, 2004

(65) Prior Publication Data

US 2006/0261945 A1  Nov. 23, 2006

(51) Int. Cl.
*G08B 23/00* (2006.01)
*G08B 13/14* (2006.01)
*G08B 21/00* (2006.01)
*A63B 61/00* (2006.01)
*A63B 43/00* (2006.01)
*A63B 43/06* (2006.01)
*G01S 13/08* (2006.01)
*G01S 3/02* (2006.01)

(52) U.S. Cl. .............. 340/573.4; 340/573.3; 340/568.6; 340/572.1; 340/572.8; 340/572.9; 340/686.1; 473/467; 473/353; 473/570; 342/127; 342/450

(58) Field of Classification Search .............. 340/568.6, 340/573.4
See application file for complete search history.

(56) References Cited

U.S. PATENT DOCUMENTS

| | | | |
|---|---|---|---|
| 5,245,317 A * | 9/1993 | Chidley et al. | 340/571 |
| 5,976,038 A | 11/1999 | Orenstein et al. | |
| 6,084,513 A * | 7/2000 | Stoffer | 340/572.2 |
| 6,373,508 B1 | 4/2002 | Moengen | |
| 6,466,125 B1 * | 10/2002 | Richards et al. | 340/573.4 |
| 6,469,628 B1 * | 10/2002 | Richards et al. | 340/573.3 |
| 6,489,893 B1 * | 12/2002 | Richards et al. | 340/573.4 |
| 6,501,393 B1 * | 12/2002 | Richards et al. | 340/993 |
| 6,552,661 B1 * | 4/2003 | Lastinger et al. | 340/572.1 |
| 6,617,962 B1 * | 9/2003 | Horwitz et al. | 340/10.4 |
| 2003/0001726 A1 * | 1/2003 | Moore | 340/10.3 |
| 2003/0142691 A1 * | 7/2003 | Hartmann | 370/442 |
| 2003/0198271 A1 * | 10/2003 | Matveev | 372/92 |

FOREIGN PATENT DOCUMENTS

GB 2 387 052 A 10/2003
WO WO 99/53339 A1 10/1999

* cited by examiner

*Primary Examiner*—Daniel Wu
*Assistant Examiner*—Jack Wang
(74) *Attorney, Agent, or Firm*—The Webb Law Firm

(57) ABSTRACT

When playing a sport it is generally difficult to localize (exactly) an accessory requirement for that sport at a determined point in time. The localizing of sports equipment may however be desired in particular situations, for instance to track down lost articles of sports equipment, or to be able to apply the rules of a sport in efficient manner. The invention therefore relates to a system for localizing sports equipment. The invention also relates to a method for localizing sports equipment using such a system.

11 Claims, 3 Drawing Sheets

SYSTEM AND METHOD FOR LOCALIZING SPORTS EQUIPMENT

BACKGROUND OF THE INVENTION

1) Field of the Invention

The invention relates to a system for localizing sports equipment. The invention also relates to a method for localizing sports equipment using such a system.

2) Description of the Prior Art

When playing a sport it is generally difficult to localize (exactly) an accessory required for that sport at a determined point in time. The localizing of sports equipment may however be desired in particular situations, for instance to track down articles of sports equipment lost during playing of the sport, or to be able to apply the rules of a sport in a more efficient manner. In golf for instance it is a frequent occurrence for a golf ball to be lost while the game is being played. Another example of where localization of articles of sports equipment may be desired is football. Since the so-called offside situation has been assessed heretofore wholly by human observation, wherein whether a football player is offside or not must be determined quickly and efficiently, a more perfect electronic observation can be desired instead of, or in addition to, human observation. In addition to the above mentioned sports and sports equipment, an electronic system for localizing articles of sports equipment is usually also a desirable addition when playing other types of sport, such as for instance tennis and (ice) hockey.

The term sports equipment should be interpreted broadly: this includes prima facie all objects, or even persons, required for playing a particular sport.

The invention has for its object to provide a system with which the location of an article of sports equipment can be determined at any time with great accuracy.

SUMMARY OF THE INVENTION

The invention provides for this purpose a system, comprising: means for generating an energy field, wherein the energy field is formed by one or more pulse streams, at least one article of sports equipment provided with at least one disrupting means for locally disrupting the energy field, detecting means for detecting the local disruption of the energy field, and a control unit coupled to the detecting means for localizing the article of sports equipment on the basis of the detected local disruption.

By means of the system according to the invention it is possible to localize quickly, effectively and accurately an article of sports equipment provided with a disrupting means in an energy field at any random point in time. The position of the article of sports equipment can herein be determined both two-dimensionally and three-dimensionally, depending on the application. The generation of the energy field in the system according to the invention takes place via pulse streams by means of UltraWideBand (UWB) technology. UWB allows the transmission of relatively large quantities of data per unit of time (between about 50 and about 1000 megabit per second, but in particular up to about 600 megabit per second). As relatively small energy surges, the pulses per se contain no data but, by transmitting the pulses a fraction sooner or later than a basic pattern, it does however become possible to transmit digital data at very high speed. In the system according to the invention an energy field formed by pulse streams is intentionally applied, since other types of energy field, for instance WiFi networks, have diverse drawbacks. Use is thus no longer made of electromagnetic (sinusoidal) waves with a determined scarce ether frequency, but use is made of electromagnetic pulses which are transmitted in unobstructed and imperceptible manner via a unique maximal bandwidth (frequency spectrum). Owing to the relatively wide frequency spectrum, the energy per frequency is relatively low, generally even much lower than the noise threshold, whereby the UWB signal will not disrupt other types of electromagnetic energy flows, or hardly so. Interference will therefore not occur when pulse streams are applied. In addition, the maximum transfer speed of data via pulses is many times greater than the transfer speed of data via electromagnetic radiation. The pulse streams are preferably made up of ultra-short pulses following closely on each other, in order to further increase the transfer speed of data. The means for generating the energy field and the detection means are preferably integrated with each other.

In a preferred embodiment the means for generating the energy field are adapted to transmit pulse beams of a plurality of pulse streams, wherein at least two pulse streams of a pulse beam are oriented at least substantially parallel to each other. By dividing the pulse signal into a plurality of parallel pulse streams, the pulses forming part of the pulse streams do not have to follow very closely on each other to increase the transfer speed. This has the advantage that the detection means can be given a less sensitive, and therefore generally less expensive form. In a particular preferred embodiment, each pulse beam comprises nine pulse streams, which pulse streams are oriented at least substantially parallel to each other. It is in general particularly advantageous to make up each pulse beam from nine pulse streams oriented parallel to each other since this considerably enhances the reliability of the system. The pulses are thus transmitted at a sufficient interval from each other, whereby error correction systems are generally no longer necessary.

In another preferred embodiment, the disrupting means is adapted to disrupt the energy field in unique manner. In the case a plurality of articles of sports equipment are placed in an energy field, the localization of each article of sports equipment can take place individually, wherein the danger of confusion can be prevented. Each golf ball can for instance thus be provided with its own, unique disrupting means. In another embodiment it is even conceivable for each player of an outdoor sport, such as for instance football, tennis and (ice) hockey, to be provided with a unique disrupting means, whereby the (relative) position of the players can be determined at any random moment.

As already described above, the system according to the invention comprises a disrupting means adapted for local disruption of the energy field. Local disruption of the pulse streams, preferably pulse beams, should be interpreted broadly. In a preferred embodiment the disrupting means is adapted to reflect the pulse streams. There therefore occurs prima facie only reflection of the pulse streams. The direction of propagation of the pulse streams is then changed (disrupted), which can be detected by the detection means. The detection of reflection of pulse streams can also be designated as a radar-related technology. In another preferred embodiment, the disrupting means is adapted to influence the pulse streams. In influencing of the pulse streams the relative orientation of the pulses relative to the basic pattern is specifically changed (disrupted), which can also be determined by the detection means.

The disrupting means is preferably formed by a chip. The chip is generally relatively small and can usually be inserted in simple manner in or on the article of sports equipment.

The chip is preferably provided with electrical energy in order to enable influencing of the pulse pattern of the energy field.

In another preferred embodiment, the disrupting means is formed by a coating on the article of sports equipment. A coating can generally be applied to the article of sports equipment in relatively simple and inexpensive manner. The coating is usually particularly adapted to reflect pulse streams. In addition to a chip and a coating, the disrupting means can also be differently designed. The disrupting means can thus also be formed for instance by at least one material part from which the article of sports equipment is manufactured.

The system is preferably provided with visual means communicating with the control unit for displaying the location of the detected article of sports equipment. It may for instance also be desirable, for instance during a game of golf, to visualize the detected location of the article of sports equipment. The visual means can herein be physically connected to the control unit, but are generally positioned at a distance from the control unit. The communication between the control unit and the visual means takes place wirelessly, preferably via electromagnetic radiation, for instance via a WiFi network. Less stringent technical requirements are usually set for the transmission of data from the control unit to the visual means. In another preferred embodiment, the communication between the control unit and the visual means also takes place wirelessly, however via pulse streams. The visual means can for instance be formed by, or form part of a portable device, which can preferably be hand-held by a user. Non-limitative examples hereof can be: a PDA, an XDA and a WDA.

The invention also relates to a method for localizing sports equipment, comprising the steps of: A) generating an energy field, wherein the energy field is formed by one or more pulse streams, B) placing in the energy field at least one article of sports equipment, provided with at least one disrupting means for locally disrupting the energy field, C) detecting the local disruption of the energy field, and D) localizing the article of sports equipment on the basis of the detected local disruption. Articles of sports equipment can thus be localized in the energy field in relatively efficient, precise and rapid manner. Further advantages of the method according to the invention have already been described above.

In a preferred embodiment of the method according to the invention, the method is provided with a step E) comprising of visualizing the location of the article of sports equipment after localizing the article of sports equipment on the basis of the detected local disruption as according to step D). Through visualizing of the article of sports equipment, a person can quickly and clearly determine the position of the article of sports equipment in an energy field. The loss of golf balls can thus be prevented, or at least countered, wherein the speed of play of the game of golf can likewise be increased considerably. The offside situations generally of importance in football can also be established in relatively rapid, simple and precise manner.

BRIEF DESCRIPTION OF THE DRAWINGS

The invention is elucidated on the basis of non-limitative exemplary embodiments shown in the following figures, wherein.

DETAILED DESCRIPTION OF THE PREFERRED EMBODIMENTS

Figure 1:
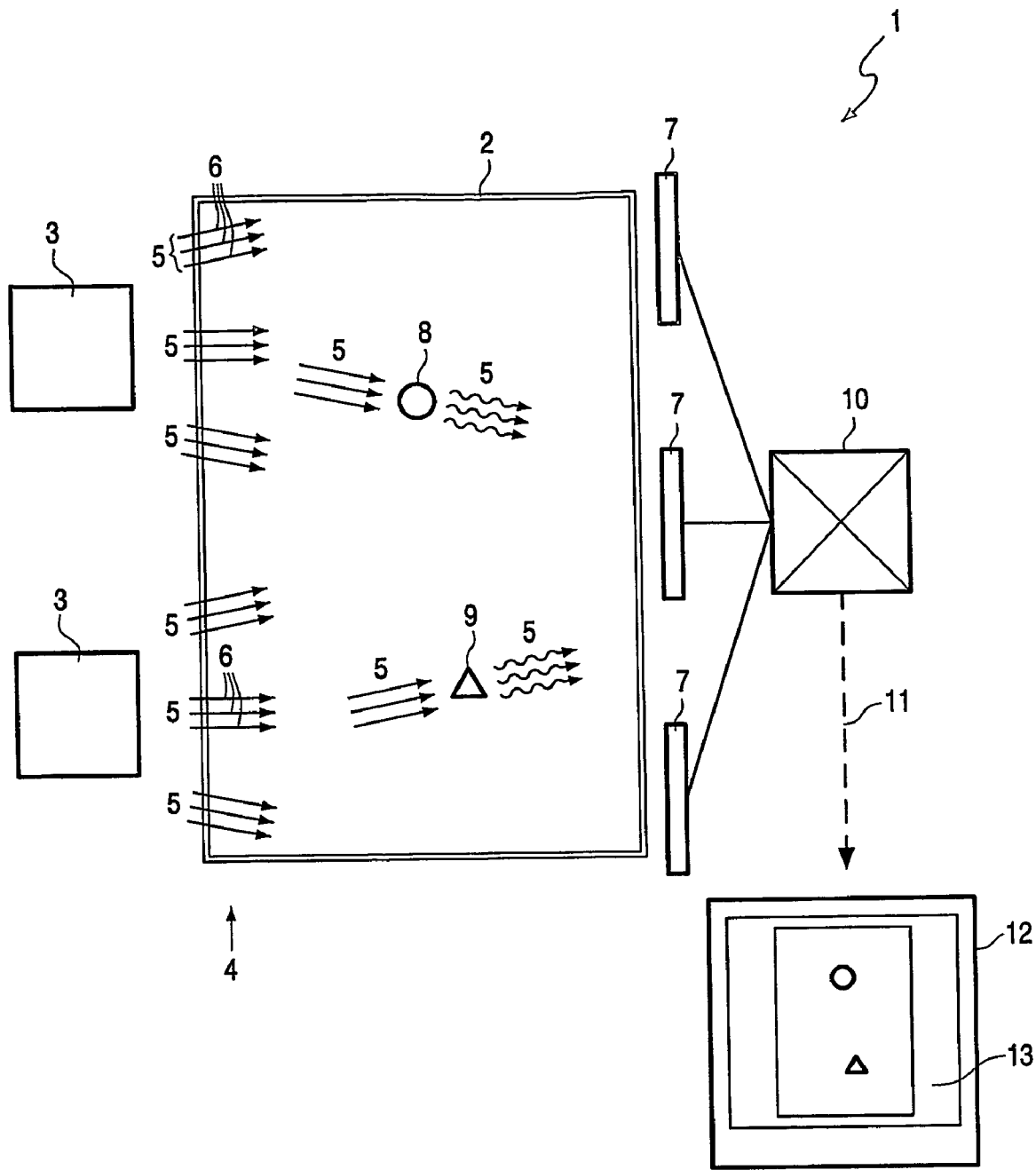
FIG. 1 shows a schematic view of a preferred embodiment of a system according to the invention.

FIG. 1 shows a schematic view of a preferred embodiment of a system 1 according to the invention. System 1 is substantially stationed on both sides of a playing field 2. System 1 comprises a plurality of transmitters 3 adapted to continuously generate an energy field 4 above playing field 2. The energy field 4 is formed by a plurality of pulse beams 5, wherein each pulse stream 5 is made up in this embodiment of three pulse streams G oriented at least substantially parallel to each other. On a side of the playing field 2 remote from transmitters 3 there are positioned a plurality of receivers 7 for receiving pulse beams 5 transmitted by transmitters 3. Now situated on playing field 2 are two articles of sports equipment 8, 9, each provided with a unique disrupting means for disrupting the pulse beams 5 locally and in unique manner. As shown in FIG. 1, pulse beams 5 are disrupted in unique manner after disruption by the articles of sports equipment 8, 9. Receivers 7 are adapted to detect these unique local disruptions, on the basis of which the position of each article of sports equipment 8, 9 can be determined on playing field 2 using a control unit 10 coupled to receivers 7. The relative position of the articles of sports equipment 8, 9 determined by control unit 10 is transmitted, preferably via a wireless network 11, to a portable device 12 provided with a display 13. Using device 12 a user can thus see where the marked articles of sports equipment 8, 9 are situated in playing field 2. In this embodiment the playing field 2 can for instance be formed by a golf course, and the articles of sports equipment 8, 9 can for instance be formed by golf balls, golf clubs, the green, the flag, the bunker and the hole. Using the system 1 according to the invention the sports equipment can be localized in simple manner at any desired point in time, whereby the loss of sports equipment can be prevented and the speed of play by (golf) players can thus be increased considerably. The relative position between different articles of sports equipment, such as for instance the distance between a golf ball and the flag, can moreover also be determined and visualized using the system according to the invention. In a variant of the shown embodiment, receivers 7 are positioned on a plurality of sides of playing field 2 and can optionally be integrated with transmitters 3.

Figure 2:
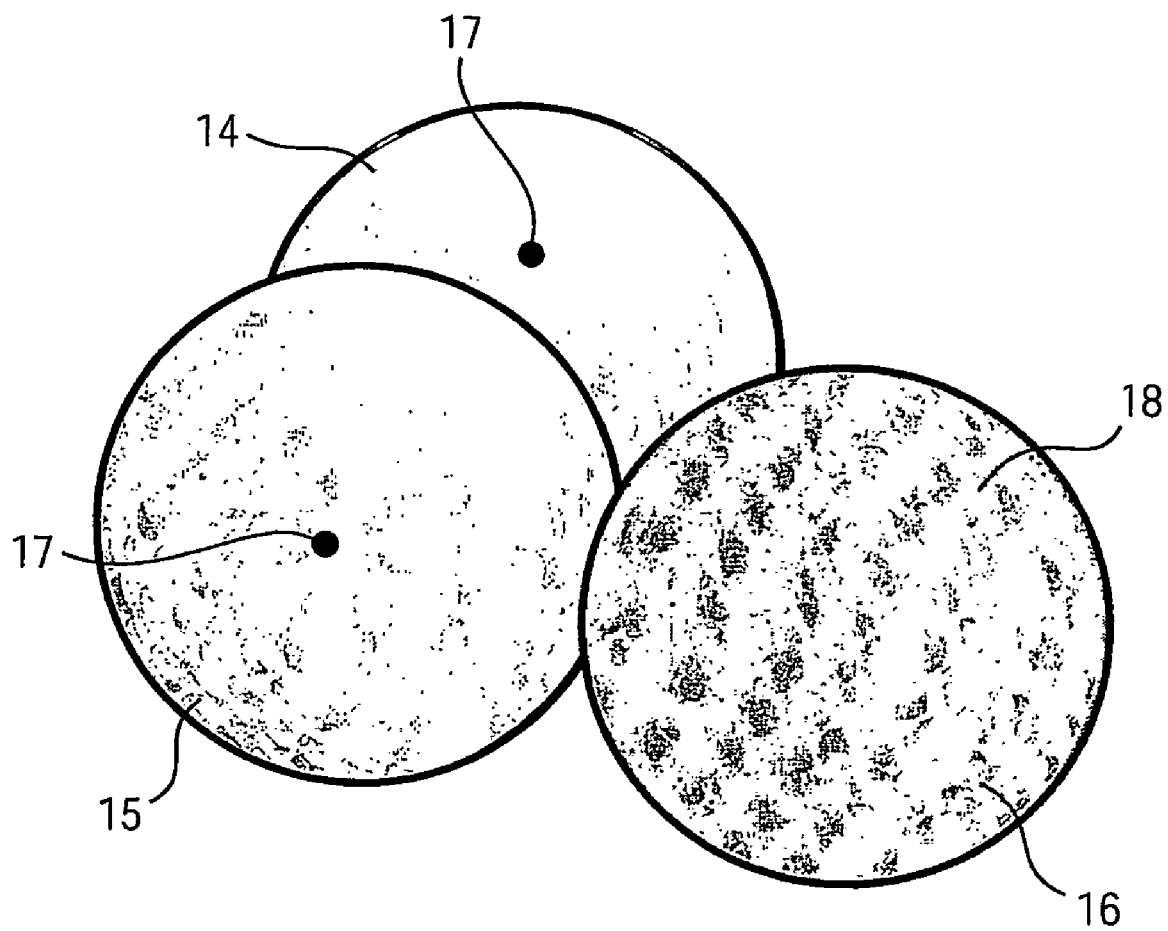
FIG. 2 shows a perspective view of a plurality of golf balls according to the invention.

FIG. 2 shows a perspective view of a plurality of golf balls 14, 15, 16 according to the invention. In the core of the two golf balls 14, 15 on the left is arranged a microchip 17 for local disruption of an energy field formed by pulse streams. Microchip 17 can be provided with energy in order to have the local disruption of the pulse streams take place more effectively. The golf ball 16 on the right is provided on an outer side with a coating 18 for reflection of pulse streams incident upon golf ball 16. As already described above, both influencing and reflection of pulse streams can be detected, on the basis of which the position of golf balls 14, 15, 16 can be determined in the energy field.

Figure 3:
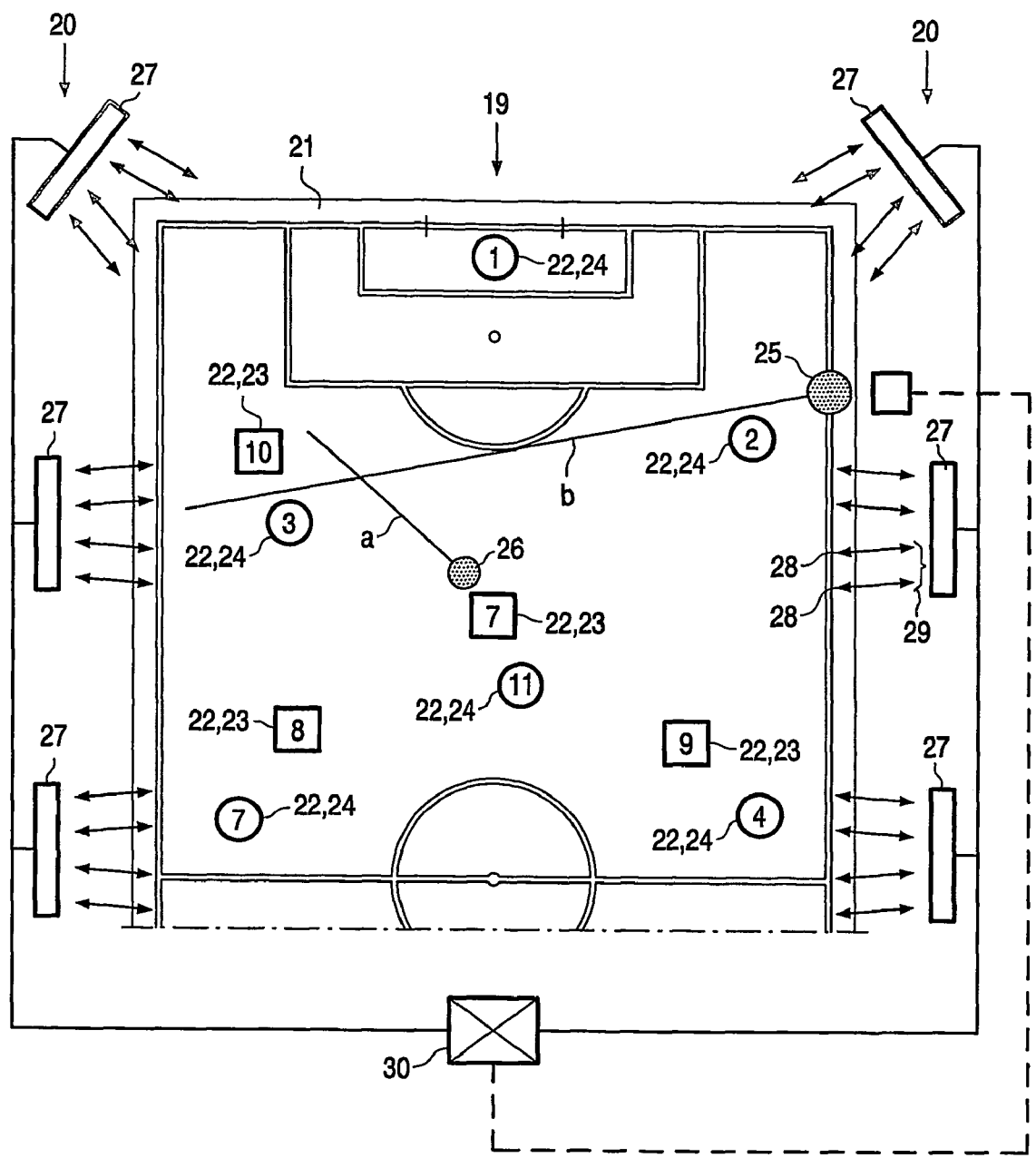
FIG. 3 shows a schematic top view of a part of a football game provided with a system according to the invention.

FIG. 3 shows a schematic top view of a part of a football game 19 provided with a system 20 according to the invention. The game of football 19 comprises a playing field 21 on which players 22 of two teams 23, 24 take up position, in addition to a linesman 25 and a football 26. Around playing field 21 there are a plurality of transmitter/receiver units 27 for transmitting respectively receiving pulse streams 28, particularly in the form of pulse beams 29. Each player 22, as well as football 26, is provided with a disrupting means (not shown) for local disruption of the generated energy field. Each team 23, 24, as well as football 26, disrupts the energy field in its own distinct manner. As already described above, a control unit 30 coupled to transmitter/receiver units 27 can at any time determine precisely the relative position of football 26 and of each player 22 on playing field 21. This can be particularly important in the case of for instance offside decisions, goal decisions and in positioning players when free kicks are being taken. Via the continuously transmitted pulse streams, whereby a transfer speed of data of up to 600 megabit per second can be achieved, the relative position of players 22 can be determined at the moment football 26 is played, and it can thus be concluded whether there is an offside situation. In the present case the football 26 is played from a player 22 to another player 22 (see line a). Since linesman 25 is not standing in line with the rearmost player 22 of the other team 24, but is viewing the situation of play at an angle, an incorrect offside decision will often be made (see line b). By providing linesman 25 with a PDA ('Personal Digital Assistant') 31 communicating with control unit 30, the situation of play can be further viewed quickly and easily from one or more different perspectives at the moment football 26 is played, whereafter which a more substantiated assessment can be made of the situation of play which has occurred. It will thus be possible to prevent, or at least counter, the taking of incorrect decisions during the game of football 19.

The invention claimed is:

1. A system for localizing articles of sports equipment, comprising:
    means for generating an electromagnetic energy field within the Ultra-Wideband (UWB), wherein the electromagnetic energy field is formed by one or more pulse streams,
    at least one article of sport equipment provided with at least one disrupting means for locally disrupting the electromagnetic energy field,
    detecting means for detecting the local disruption of the electromagnetic energy field, and
    a control unit coupled to the detecting means for localizing the article of sports equipment on the basis of the detected local disruption,
    wherein the means for generating the electromagnetic energy field are adapted to transmit pulse beams of a plurality of pulse streams, wherein each pulse beam comprises nine pulse streams oriented at least substantially parallel to each other.

2. The system as claimed in claim 1, wherein each disrupting means is adapted to disrupt the electromagnetic energy field in a manner that distinguishes it from other disrupting means in the system.

3. The system as claimed in claim 1, wherein the disrupting means is adapted to reflect the pulse streams.

4. The system as claimed in claim 1, wherein the disrupting means is adapted to influence the pulse streams.

5. The system as claimed in claim 1, wherein the disrupting means is formed by a chip.

6. The system as claimed in claim 1, wherein the disrupting means is formed by a coating.

7. The system as claimed in claim 1, wherein the system is provided with visual means communicating with the control unit for displaying the location of the detected article of sports equipment.

8. The system as claimed in claim 7, wherein the communication between the control unit and the visual means takes place wirelessly via electromagnetic radiation.

9. The system as claimed in claim 7, wherein the communication between the control unit and the visual means takes place wirelessly via pulse streams.

10. A method for localizing sports equipment, comprising the steps of:
    A) generating an electromagnetic energy field within the Ultra-Wideband (UWB), wherein the electromagnetic energy field is formed by multiple pulse beams, wherein each pulse beam comprises nine pulse streams oriented at least substantially parallel to each other,
    B) placing in the electromagnetic energy field at least one article of sports equipment, provided with at least one disrupting means for locally disrupting the electromagnetic energy field,
    C) detecting the local disruption of the electromagnetic energy field, and
    D) localizing the article of sports equipment on the basis of the detected local disruption.

11. The method as claimed in claim 10, wherein the method is provided with a step E) comprising of visualizing the location of the article of sports equipment after localizing the article of sports equipment on the basis of the detected local disruption as according to step D).

* * * * *

UNITED STATES PATENT AND TRADEMARK OFFICE
CERTIFICATE OF CORRECTION

PATENT NO. : 7,649,467 B2  Page 1 of 1
APPLICATION NO. : 10/552549
DATED : January 19, 2010
INVENTOR(S) : Martijn Schimmer et al.

It is certified that error appears in the above-identified patent and that said Letters Patent is hereby corrected as shown below:

Title Page, (*) Notice: Subject to any disclaimer, the term of this patent is extended or adjusted under 35 U.S.C. 154(b) by 0 days.

should read

--(*) Notice: Subject to any disclaimer, the term of this patent is extended or adjusted under 35 U.S.C. 154(b) by 77 days.

This patent is subject to a Terminal Disclaimer.--

Face of the Patent, insert

--Item (30) Foreign Application Priority Data

April 15, 2003 (NL) ........................... 1023183--

Face of the Patent, See Item (56) References Cited, U.S. PATENT DOCUMENTS, add the following:

--6,504,483 B1    7/2003    Richards et al.    ..........340/573.3--

Signed and Sealed this

Eighth Day of June, 2010

David J. Kappos
*Director of the United States Patent and Trademark Office*